United States Patent
Nishikawa (10) Patent No.: US 9,714,737 B2
(45) Date of Patent: Jul. 25, 2017

(54) KINEMATIC SUPPORT STRUCTURE

(71) Applicant: NATIONAL INSTITUTES OF NATURAL SCIENCES, Tokyo (JP)

(72) Inventor: Jun Nishikawa, Tokyo (JP)

(73) Assignee: National Institute of Natural Sciences, Tokyo (JP)

( * ) Notice: Subject to any disclaimer, the term of this patent is extended or adjusted under 35 U.S.C. 154(b) by 0 days.

(21) Appl. No.: 14/727,590

(22) Filed: Jun. 1, 2015

(65) Prior Publication Data
US 2015/0369419 A1 Dec. 24, 2015

(30) Foreign Application Priority Data
Jun. 24, 2014 (JP) .................................. 2014-128983

(51) Int. Cl.
*B65D 19/00* (2006.01)
*F16M 11/18* (2006.01)
*F16M 11/22* (2006.01)
*F16M 11/04* (2006.01)

(52) U.S. Cl.
CPC .......... *F16M 11/18* (2013.01); *F16M 11/041* (2013.01); *F16M 11/22* (2013.01)

(58) Field of Classification Search
CPC ...... F16C 23/08; F16C 23/084; G01B 5/0004; F16M 11/22
See application file for complete search history.

(56) References Cited

U.S. PATENT DOCUMENTS

| | | | | |
|---|---|---|---|---|
| 5,440,655 A | * | 8/1995 | Kaplow | G02B 6/381 385/16 |
| 5,574,561 A | * | 11/1996 | Boudreau | G01B 5/0004 228/180.21 |
| 6,520,283 B2 | * | 2/2003 | Kemeny | F16C 23/08 181/207 |
| 8,413,948 B2 | | 4/2013 | Kemeny | |
| 2005/0078386 A1 | | 4/2005 | Takabayashi | |
| 2011/0222148 A1 | | 9/2011 | Oota | |

FOREIGN PATENT DOCUMENTS

| | | |
|---|---|---|
| JP | 2004-062091 A | 2/2004 |
| JP | 2004-075209 A | 3/2004 |
| JP | 2006-078187 A | 3/2006 |
| JP | 2008-159632 A | 7/2008 |

* cited by examiner

*Primary Examiner* — Amy Sterling
(74) *Attorney, Agent, or Firm* — Birch, Stewart, Kolasch & Birch, LLP (57) ABSTRACT

A kinematic support structure of a "groove-groove-groove" type that reduces friction between a first base and a second base is provided. In the kinematic support structure, a first base comprises three grooves and a second base comprises three other grooves. Balls are all movable with respect to the first base and the second base. Two grooves corresponding in the two bases face each other across respective one of the balls.

7 Claims, 7 Drawing Sheets

KINEMATIC SUPPORT STRUCTURE

BACKGROUND OF THE INVENTION

Field of the Invention

The present invention relates to a kinematic support structure, and in particular to that of a "groove-groove-groove" type.

Description of the Related Art

A kinematic support structure is a support structure for repeating a relative positional relationship between two bases with high precision and avoiding deformation by releasing the differences in thermal expansion between the bases. A conventional kinematic support structure comprises a base (first base) wherein three ball-like protrusions (balls) are fixed and another base (second base) facing this.

Figure 7:
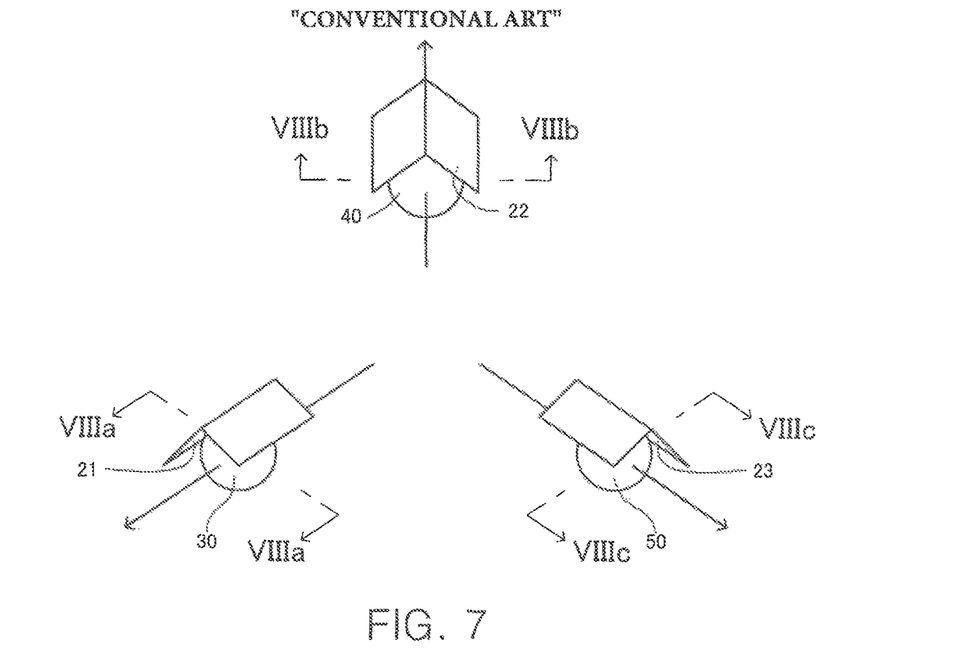
FIG. 7 is a diagram showing a construction of a conventional kinematic support structure.
Figure 8:
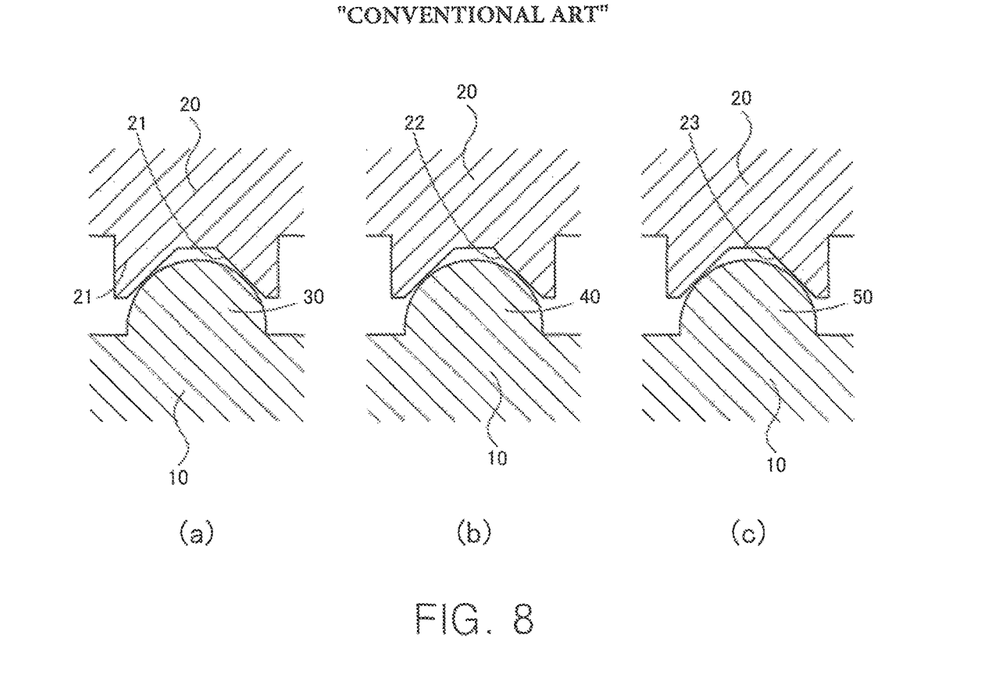
FIG. 8 shows cross-sectional views of the conventional kinematic support structure.

FIGS. 7 and 8 schematically show an example of a construction for a conventional kinematic support structure. FIG. 8 (a) (b) and (c) represent cross-sectional views taken along line VIIIa-VIIIa, line VIIIb-VIIIb and line VIIIc-VIIIc in FIG. 7 respectively. Ball-like protrusions 30, 40 and 50 are provided and fixed on a first base 10. The ball-like protrusions 30, 40 and 50 abut on a second base 20, thereby determining the relative positional relationship between the first base 10 and the second base 20 uniquely.

The ball-like protrusions 30, 40 and 50 abut on V-shaped grooves 21, 22 and 23 of the second base 20 respectively in two points. Thus, the first base 10 and the second base 20 contact in six points, thereby restricting six degrees of freedom (X, Y, Z, $\theta_x$, $\theta_y$, $\theta_z$) representing the relative position and determining their positions.

Figure 9:
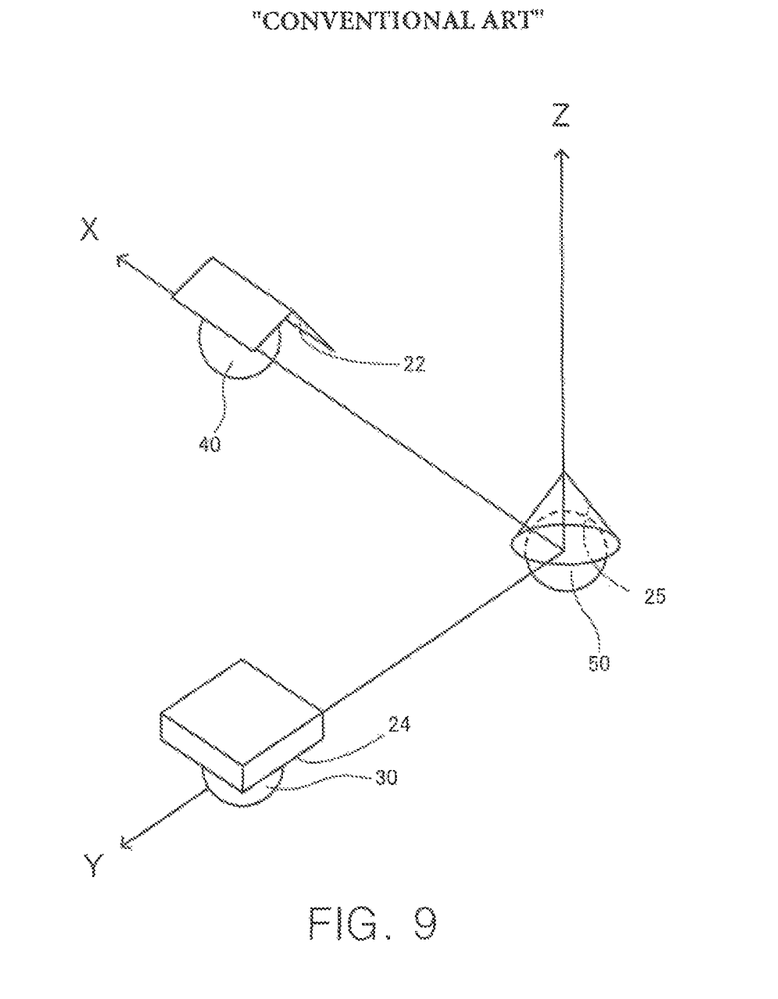
FIG. 9 is a diagram showing another construction of a conventional kinematic support structure.

FIG. 9 schematically shows another example of a construction for a conventional kinematic support structure. The example adopts a "plane-groove-cone" construction instead of the "groove-groove-groove" construction shown in FIG. 8. The ball-like protrusion 30 abuts on a plane portion 24 in a single point, the ball-like protrusion 40 abuts on a V-shaped groove 22 in two points and the ball-like protrusion 50 abuts on a conical concave portion 25 with a circle (or in three points). Thus, the first base 10 and the second base 20 contact in the three points and a circle (or in the six points) in total, thereby restricting six degrees of freedom (X, Y, Z, $\theta_x$, $\theta_y$, $\theta_z$) representing the relative position and determining their positions.

As an example of a construction for such a kinematic support structure, a construction described as conventional art in Japanese Patent Application Laid Open No. 2008-159632 can be referred to. FIG. 9 of the document discloses an example of the "plane-groove-cone" type and an example of the "groove-groove-groove" type.

Also, Japanese Patent No. 4836940 (corresponding to U.S. Pat. No. 8,413,948) describes an example of a construction wherein a portion of the kinematic support structure is modified. FIGS. 1A-1D of the document disclose an example of the "plane-groove-cone" type.

Regarding the "plane-groove-cone" type, the use of spheres which are not fixed to any base instead of the ball-like protrusions is known. FIG. 6 of Japanese Patent Application Laid Open No. 2006-78187 discloses an example of such a construction.

In order for the "groove-groove-groove" type of kinematic support structure to function ideally, it is necessary that the first base and the second base contact via the ball-like protrusions and that points of contact between the ball-like protrusions of the first base and the second base move (slide) without any resistance. However, conventional techniques have a problem in that there may be friction between the ball-like protrusions of the first base and the second base. Examples of detrimental phenomena caused due to the friction are: positional precision of the bases degrades; the structure is displaced or deformed because detrimental force is exerted; etc.

Note that, regarding the "plane-groove-cone" type as described in Japanese Patent Application Laid Open No. 2006-78187, it is known to use spheres which are not fixed to any base. However, even those skilled in the art would not conceive of combining such a construction with the "groove-groove-groove" type. For example, in FIG. 6 of Japanese Patent Application Laid Open No. 2006-78187, none of the balls are fixed to the bases, so if this construction is applied to the "groove-groove-groove" type without any modification, it would appear that it would not function as a positioning and locating structure.

SUMMARY OF THE INVENTION

The present invention is made in order to solve these problems and is aimed at providing a kinematic support structure of the "groove-groove-groove" type that reduces the friction between the bases.

In order to solve the above problems, a kinematic support structure related to the present invention comprises:

a first support member comprising a first groove portion, a second groove portion and a third groove portion;

a second support member comprising a fourth groove portion, a fifth groove portion and a sixth groove portion; and a first ball, a second ball and a third ball all movable with respect to the first support member and the second support member, wherein:

the first groove portion and the fourth groove portion face each other across the first ball;

the second groove portion and the fifth groove portion face each other across the second ball; and the third groove portion and the sixth groove portion face each other across the third ball.

The first groove portion, the second groove portion and the third groove portion may be arranged in a radial configuration;

the fourth groove portion, the fifth groove portion and the sixth groove portion may be arranged in a radial configuration;

the first groove portion may abut on the first ball at two points;

the second groove portion may abut on the second ball at two points;

the third groove portion may abut on the third ball at two points;

the fourth groove portion may abut on the first ball at two points;

the fifth groove portion may abut on the second ball at two points; and the sixth groove portion may abut on the third ball at two points.

The first support member may comprise:

a first ball holding structure for restricting a position of the first ball within a first travel range;

a second ball holding structure for restricting a position of the second ball within a second travel range; and a third ball holding structure for restricting a position of the third ball within a third travel range.

The travel ranges may have respective finite expanses;

the first ball holding structure may comprise an elastic member for pushing the first ball in an inward direction of the first travel range;

the second ball holding structure may comprise an elastic member for pushing the second ball in an inward direction of the second travel range; and the third ball holding structure may comprise an elastic member for pushing the third ball in an inward direction of the third travel range.

The kinematic support structure may comprise a ball holding structure switchable between a fixed ball state and a travelable ball state.

The kinematic support structure may further comprise pressing means for pushing the first support member and the second support member toward each other.

According to the kinematic support structure related to the present invention, the balls are movable not only with respect to the second base but also with respect to the first base, so the friction between the bases can be reduced in the kinematic support structure of the "groove-groove-groove" type.

DESCRIPTION OF THE PREFERRED EMBODIMENTS

Hereinafter, a description will be given of embodiments of the present invention with reference to the accompanying drawings.

First Embodiment

Figure 1:
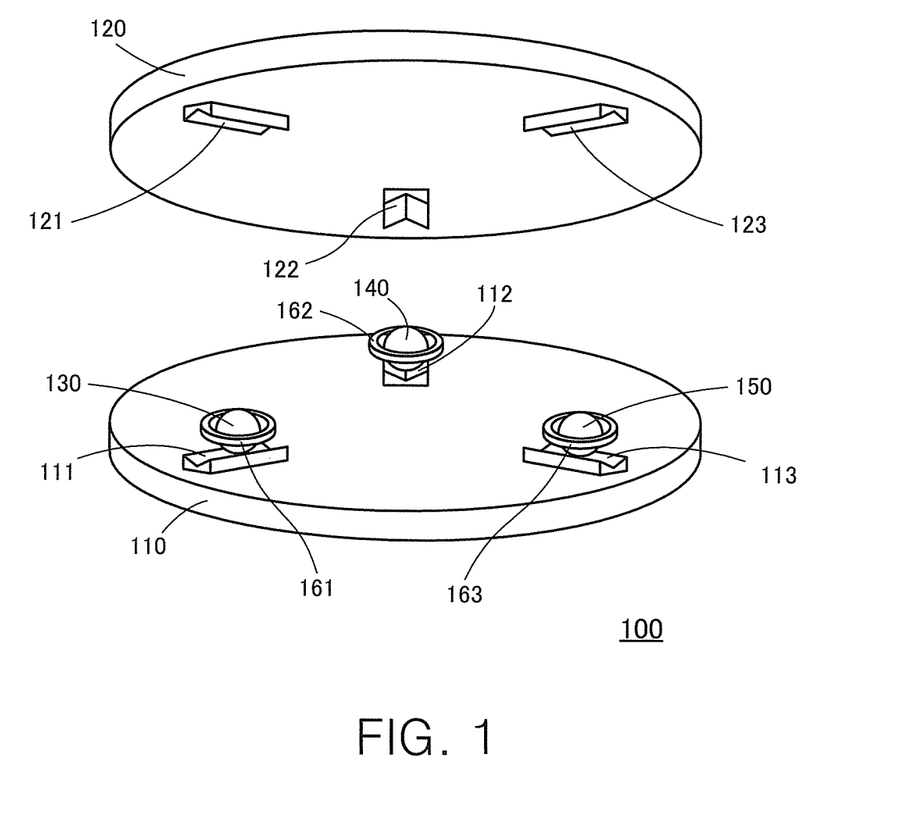
FIG. 1 is a diagram showing a construction of a kinematic support structure related to a first embodiment of the present invention.

FIG. 1 shows a construction of a kinematic support structure 100 related to a first embodiment of the present invention. The kinematic support structure 100 may be referred to as a kinematic support structure of the "groove-groove-groove" type. Note that FIG. 1 is aimed at showing a general construction of components and is not strictly precise about specific structures or the positional relationship of the components (for example, although the grooves are shown to protrude from surfaces of the bases, they may actually be formed by cutting into the surfaces of the bases). The kinematic support structure 100 is for example constructed as a portion of a kinematic support apparatus.

The kinematic support structure 100 comprises a first base 110 (first support member) and a second base 120 (second support member). The first base 110 comprises a groove 111 (first groove portion), another groove 112 (second groove portion) and another groove 113 (third groove portion).

In relation to the first base 110, a ball 130 (first ball), another ball 140 (second ball) and another ball 150 (third ball) are provided as balls. The balls 130, 140 and 150 are located at the grooves 111, 112 and 113 respectively. The balls 130, 140 and 150 are for example spheres.

The first base 110 comprises a ball holding structure 161 (first ball holding structure), another ball holding structure 162 (second ball holding structure) and another ball holding structure 163 (third ball holding structure). The ball holding structures 161, 162 and 163 are located around the balls 130, 140 and 150 respectively. Although not specifically shown in the drawings, the ball holding structures 161, 162 and 163 are fixed to the first base 110. Also, the ball holding structures 161, 162 and 163 do not have to contact the first base 110 or the second base 120 directly and may be held in the proximity of the first base 110 via some support member.

The second base 120 may be constructed, for example, in a manner similar to a conventional second base of the "groove groove-groove" type. An example is shown in the attached drawings. The second base 120 comprises a groove 121 (fourth groove portion), another groove 122 (fifth groove portion) and another groove 123 (sixth groove portion).

The groove 111 of the first base 110 includes respective portions of two planes forming an angle greater than 0 degree and smaller than 180 degrees and is constructed so that it abuts a sphere constantly at two points if the center of the sphere travels along a particular line segment. The groove 112 and the groove 113 of the first base 110 have similar constructions. The grooves 121, 122 and 123 of the second base 120 also have similar constructions. The directions of the line segments are referred to as the directions of respectively corresponding grooves.

The groove 111 of the first base 110 and the groove 121 of the second base 120 face each other across the ball 130. Similarly, the groove 112 of the first base 110 and the groove 122 of the second base 120 face each other across the ball 140 and the groove 113 of the first base 110 and the groove 123 of the second base 120 face each other across the ball 150. Two grooves facing each other (e.g. the grooves 112 and 122) are parallel to each other in this example.

Figure 2:
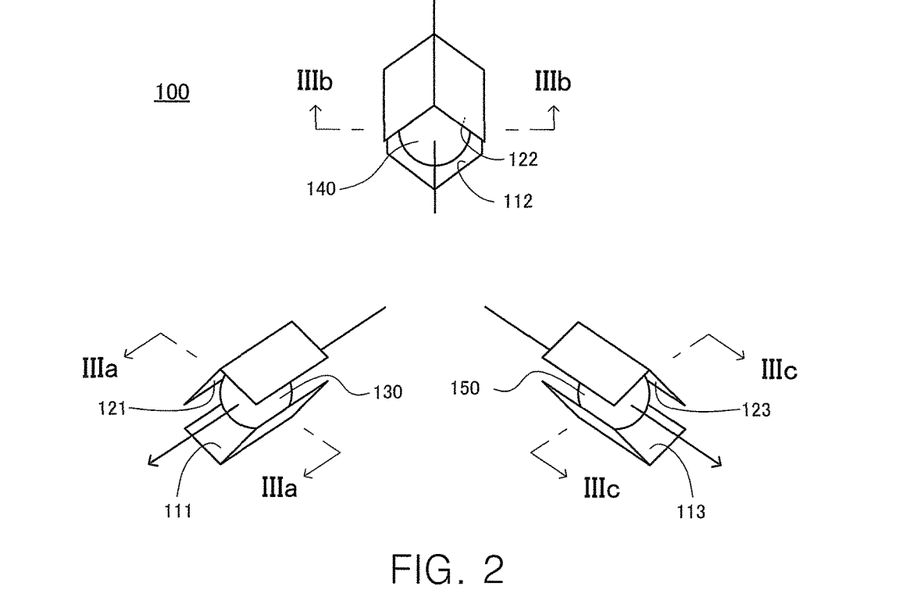
FIG. 2 is a diagram showing more detailed constructions of FIG. 1 around the balls.
Figure 3:
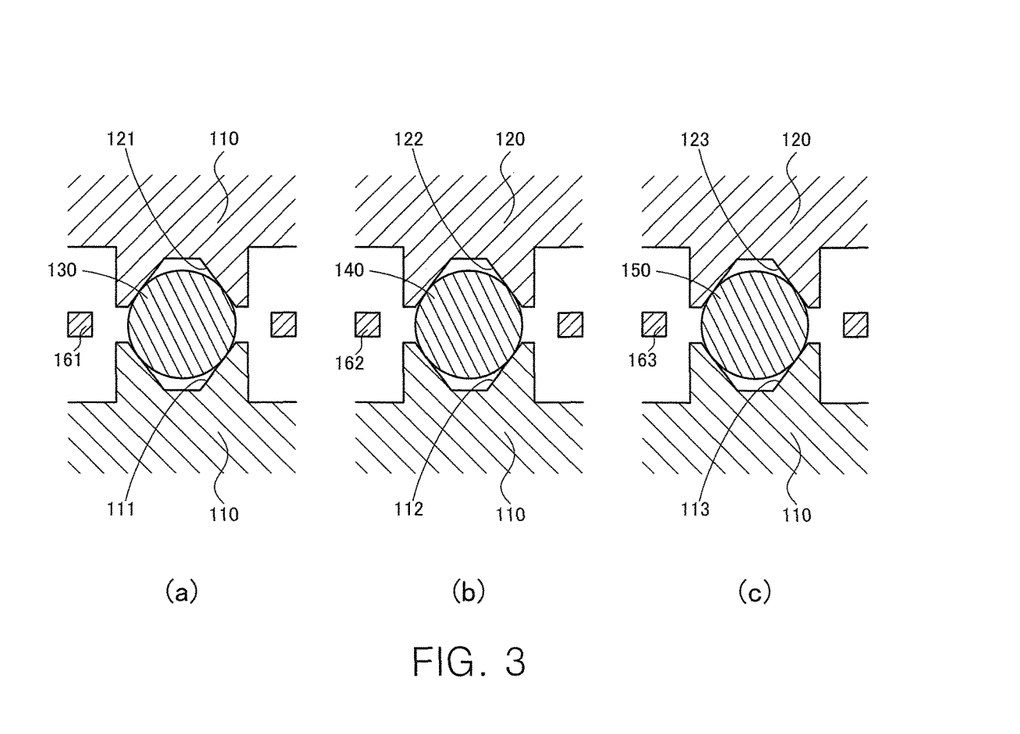
FIG. 3 shows cross-sectional views of portions in FIG. 2.

FIGS. 2 and 3 show more detailed constructions around the balls 130, 140 and 150. Note that, for the sake of illustration, the attached drawings indicate that a line perpendicular to the bases extends in a vertical direction, and in particular, that the first base 110 is located at the bottom and the second base 120 is located on top. However, their location may be determined in any way when actually placing the kinematic support structure 100. For example, they may be located so that the first base 110 is on top. Also, they may be located so that a line perpendicular to the bases extends in a horizontal direction or a diagonal direction.

The grooves 111, 112 and 113 of the first base 110 are arranged in a radial configuration, for example on a single plane or a substantially single plane. The relationship among the grooves 121, 122 and 123 of the second base 120 is similar to this.

FIG. 3(a) is a cross-sectional view of the ball 130 and around it by a plane including the center of the ball 130 and perpendicular to the groove 111 (i.e. a plane along line IIIa-IIIa in FIG. 2). FIG. 3(b) is a cross-sectional view of the ball 140 and around it by a plane including the center of the ball 140 and perpendicular to the groove 112 (i.e. a plane along line IIIb-IIIb in FIG. 2). FIG. 3(c) is a cross-sectional view of the ball 150 and around it by a plane including the center of the ball 150 and perpendicular to the groove 113 (i.e. a plane along line IIIc-IIIc in FIG. 2). Note that, regarding the ball holding structures 161, 162 and 163, FIG. 3 merely shows their cross-sectional end faces.

The balls 130, 140 and 150 are all movable with respect to the first base 110 and the second base 120 within respective predetermined ranges. In the present specification, the term "to move" includes, to travel (i.e. displacement of the position of a center), to rotate around a center, to roll and combinations thereof. Also, the travelable ranges are restricted by the ball holding structures. The ball holding structure 161 restricts the position of the ball 130 within a predetermined travel range (first travel range), the ball holding structure 162 restricts the position of the ball 140 within another predetermined travel range (second travel range) and the ball holding structure 163 restricts the position of the ball 150 within another predetermined travel range (third travel range).

The travel ranges have non-zero finite expanses. For example, if the ball 130 travels on the groove 111, the travel range of the center of the ball 130 is on a line parallel to the groove 111 (e.g. on a straight or curved line corresponding to the shape of the groove 111 or a corresponding structure) and the movable range has a finite length.

Although specific constructions of the ball holding structures 161, 162 and 163 are not described here, those skilled in the art can design them as needed based on the descriptions herein. For example, the ball holding structures 161, 162 and 163 can be formed by using elastic members (such as rubber) of a circular shape. In such a construction, the elastic members of the ball holding structures 161, 162 and 163 push the balls 130, 140 and 150 in inward directions of the respective travel ranges. Here, the term "inward direction" may be defined for example as a direction that reduces distances between the balls and the centers of the corresponding travel ranges.

Further, for example, if the inner diameter of the ball holding structure 161 is designed to be greater than the diameter of the ball 130 by a predetermined length as shown in FIGS. 1 and 3, the predetermined length and elasticity of the ball holding structure 161 would define the travel range of the ball 130. This is also applied similarly to the relationship between the ball holding structure 162 and the ball 140 and the relationship between the ball holding structure 163 and the ball 150. Further, the ball holding structures or portion(s) thereof may be constructed of non-elastic members (such as a metal).

As shown in FIG. 3, the groove 111 of the first base 110 and the groove 121 of the second base 120 face each other across the ball 130 and abut on the ball 130 respectively in two points. the groove 112 of the first base 110 and the groove 122 of the second base 120 face each other across the ball 140 and abut on the ball 140 respectively in two points. the groove 113 of the first base 110 and the groove 123 of the second base 120 face each other across the ball 150 and abut on the ball 150 respectively in two points.

Thus, the bases of the kinematic support structure 100 abut the balls respectively in six points in total by respective three grooves abutting on the balls respectively in two points. As a result, the kinematic support structure 100 restricts six degrees of freedom that define the relative positional relationship between the first base 110 and the second base 120 so that the relative position is determined uniquely and the two bases are fixed with respect to each other. Note that there are not any other contacts between the balls 130, 140 and 150 and the second base 120, so no extra restriction is caused and no detrimental forces are exerted within the kinematic support structure 100.

Also, the balls are not fixed to the first base 110 or the second base 120. Therefore, if the first base 110 and the second base 120 expand or contract with respect to each other due to e.g. differences in thermal expansion, the balls would roll freely in response thereto. In particular, the balls are not fixed to any base and can roll freely along the corresponding grooves, so the friction can be reduced.

For example, the ball 130 releases relative expansion and contraction of the bases in the direction of the groove 111 by rolling along the groove 111. Note that, because the ball 130 is sandwiched by the grooves 111 and 121 and abuts on both the first base 110 and the second base 120 respectively in two points, displacement of one of the bases in a direction perpendicular to the groove 111 so that the ball 130 would derail (with an assumption that an appropriate pressing force is exerted on the two bases in facing directions) would not occur. Similarly, the balls 140 and 150 release relative expansion and contraction in the directions of the grooves 112 and 113 respectively by rolling along the grooves 112 and 113.

Hereinafter, some differences between conventional constructions and the construction of the present invention are explained. In the conventional constructions shown in FIGS. 7 and 8, ideally, the ball-like protrusions 30, 40 and 50 slide in respectively corresponding directions while contacting the corresponding grooves 21, 22 and 23 so that expansion and contraction in respective directions are released. However, there is static friction between the ball-like protrusions and the corresponding grooves and there is also sliding friction when the ball-like protrusions slide, so the friction is relatively large and the ball-like protrusions might not slide to positions precisely corresponding to the expansion or contraction of the bases.

In contrast, in the construction of the present invention shown in FIGS. 2 and 3, the balls 130, 140 and 150 are not fixed to the first base 110 and they can roll freely, so the friction can be reduced. Rolling friction is generally on an order of $\frac{1}{1000}$ to $\frac{1}{10000}$ or the like of the static friction. Thus, the expansion and contraction of the bases can be released with little friction, so forces exerted in the kinematic support structure 100 due to the expansion and contraction of the bases can be reduced and the kinematic support apparatus can be realized with small distortion. As a result, a member to be supported (such as an optical component) can be located on the kinematic support apparatus with high repeatability.

Also, Japanese Patent No. 4836940 (corresponding to U.S. Pat. No. 8,413,948) cited above does not describe any construction wherein shapes of all portions facing each other match between the bases. For example, a groove faces a planer portion or another groove faces a conical concave portion. In such a construction, the relative positional relationship between the bases cannot be determined uniquely if the balls roll, so it cannot precisely function as any kinematic support structure, thereby reducing positional repeatability.

Figure 6:
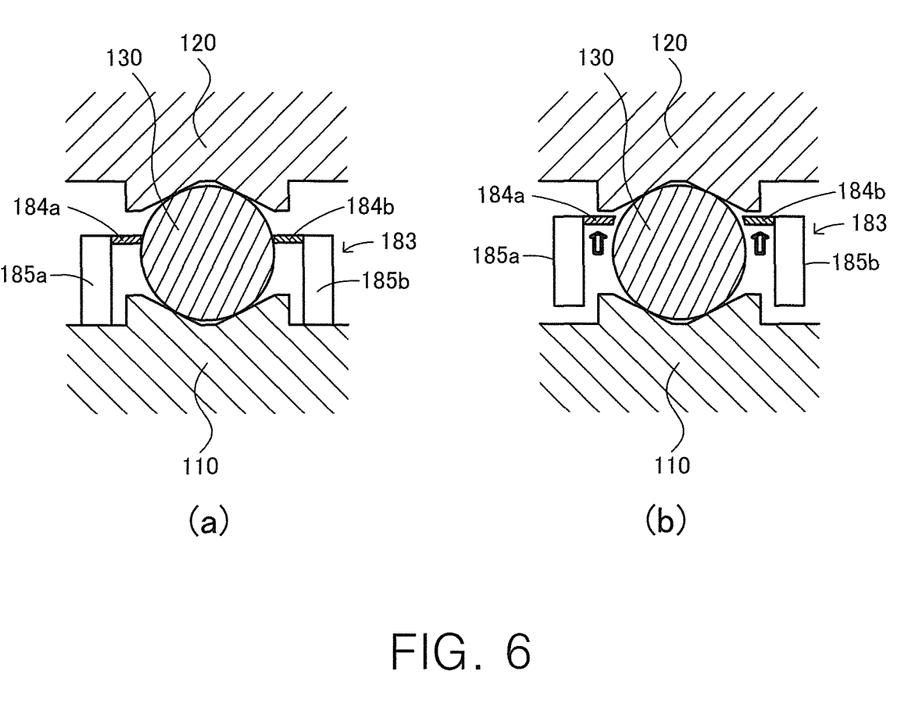
FIG. 6 is a diagram showing another example of a ball holding structure switchable between the fixed ball state and the travelable ball state.

Note that, as described in the section "BACKGROUND OF THE INVENTION" above, FIG. 6 of Japanese Patent Application Laid Open No. 2006-78187 describes the "plane-groove-cone" type wherein spheres which are not fixed to any base are used. However, even those skilled in the art could not conceive of combining such a construction with the "groove-groove-groove" type. For example, in FIG.

6 of Japanese Patent Application Laid Open No. 2006-78187, none of the balls are fixed to the bases, so if this construction is applied to the "groove-groove-groove" type without any modification, it seems that it would not function as a positioning and locating structure. Thus, a portion of the inventiveness of the present invention resides in the point that specific consideration is given to an apparently non-functioning combination in order to obtain a feasible construction.

The following modification may be added to the above first embodiment. The grooves may have a different shape from a V-shaped one. For example, they may be constructed by groove-like curved surfaces or a pair of cylinders if the constructions can hold the corresponding balls appropriately in two points (or in a contact portion that can be substantially regarded as two points).

The centers of the balls may be substantially fixed if the balls can roll slightly with respect to the first base 110 and the second base 120. For example, if a ball holding structure is constructed so that it has an elastic member in an inner side and the inner diameter of the ball holding structure matches the diameter of the corresponding ball, the ball would always be held in a predetermined single position due to the elasticity of the ball holding structure, at least until the second base 120 is located. Even in such a case, effects of the present invention can be obtained by designing the elasticity of the elastic member of the ball holding structure to be small (i.e. easy to deform) so that the ball is held so loosely that slight free rolling of the ball, caused upon locating the bases or expansion and contraction of the bases, is not disturbed.

Specific shapes of the ball holding structures are not limited to those shown in the drawings. The ball holding structures only have to restrict traveling of the corresponding balls in the directions along the grooves. For example, two separate members may be located at opposite ends in a direction along the groove. Also, a spring may be used for the elastic member instead of rubber or the like. Further, the balls may be held within the predetermined travel ranges by magnetic force or the like.

Also, if any travel range (s) of the ball (s) do not have to be restricted, the corresponding ball holding structure(s) may be omitted. This corresponds to, for example, a case wherein a user of the kinematic support structure 100 knows the travel ranges of the balls and the user can perform adjustment so that the balls do not derail from the corresponding grooves.

Figure 4:
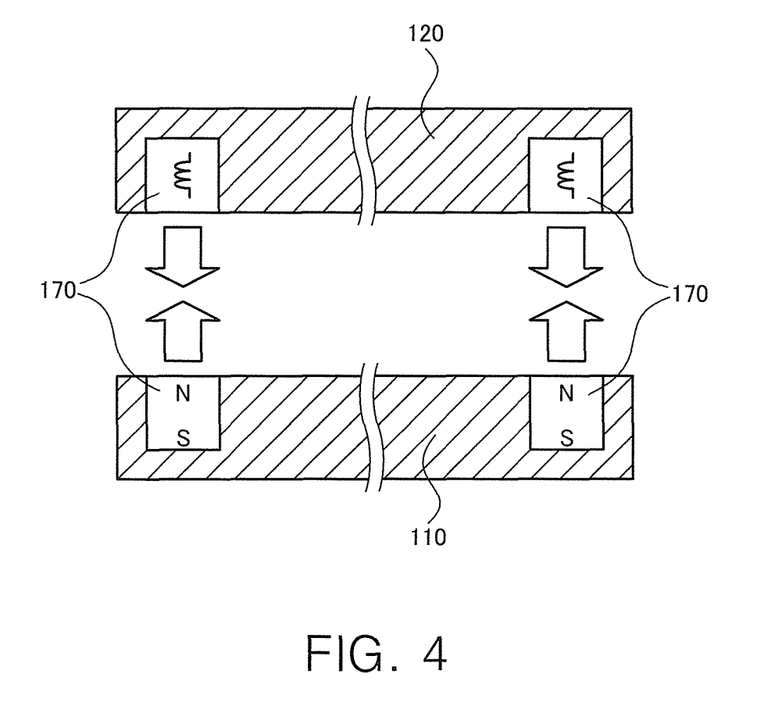
FIG. 4 is a schematic diagram showing an example of pressing means.

Also, the kinematic support structure 100 may comprise pressing means for pushing the first base 110 and the second base 120 toward each other. FIG. 4 schematically shows an example of the pressing means (note that a portion of the components is omitted in FIG. 4). In the first embodiment, the friction around the balls is reduced by effects of the present invention, so vibration may be likely to occur. The pressing means 170 suppresses this vibration. Also, effects for improving locating precision or stability can be expected.

The pressing means 170 comprises a permanent magnet provided at the first base 110 and an electromagnet provided at the second base 120. Supplying current to the electromagnet causes suction between the first base 110 and the second base 120 so that the vibration is suppressed, so the locating precision or the stability is expected to be improved. Note that the specific construction of the pressing means 170 is not limited to the one shown in FIG. 4 and may be constructed in various ways if it pushes the first base 110 and the second base 120 toward each other. This can be realized by using vacuum suction, magnetic force, electromagnetic force, pressure, etc.

Further, if a permanent magnet or an electromagnet (they are referred to by the generic term "magnet") is used for one of the bases, the other base may be provided with a region including a ferromagnetic substance (e.g. a plate consisting of metal such as iron) instead of the magnet. If the bases are to be sucked by using vacuum suction, magnetic force, electromagnetic force, etc., it is preferable to provide a plurality of suction devices at positions symmetric around a holding point (point symmetric or rotation symmetric) or provide a circular suction device centered on the holding point. Further, in the case of the arrangement shown in FIG. 1, the second base 120 may be pressed mechanically by an arm on its top. Also in this case, it is preferable to maintain symmetry around the holding point.

The ball holding structures may be switchable between a state wherein the balls are fixed respectively in single points (i.e. a state wherein the balls cannot travel; hereinafter referred to as "fixed ball state") and a state wherein the balls can travel within ranges having a predetermined expanse (hereinafter referred to as "travelable ball state").

Figure 5:
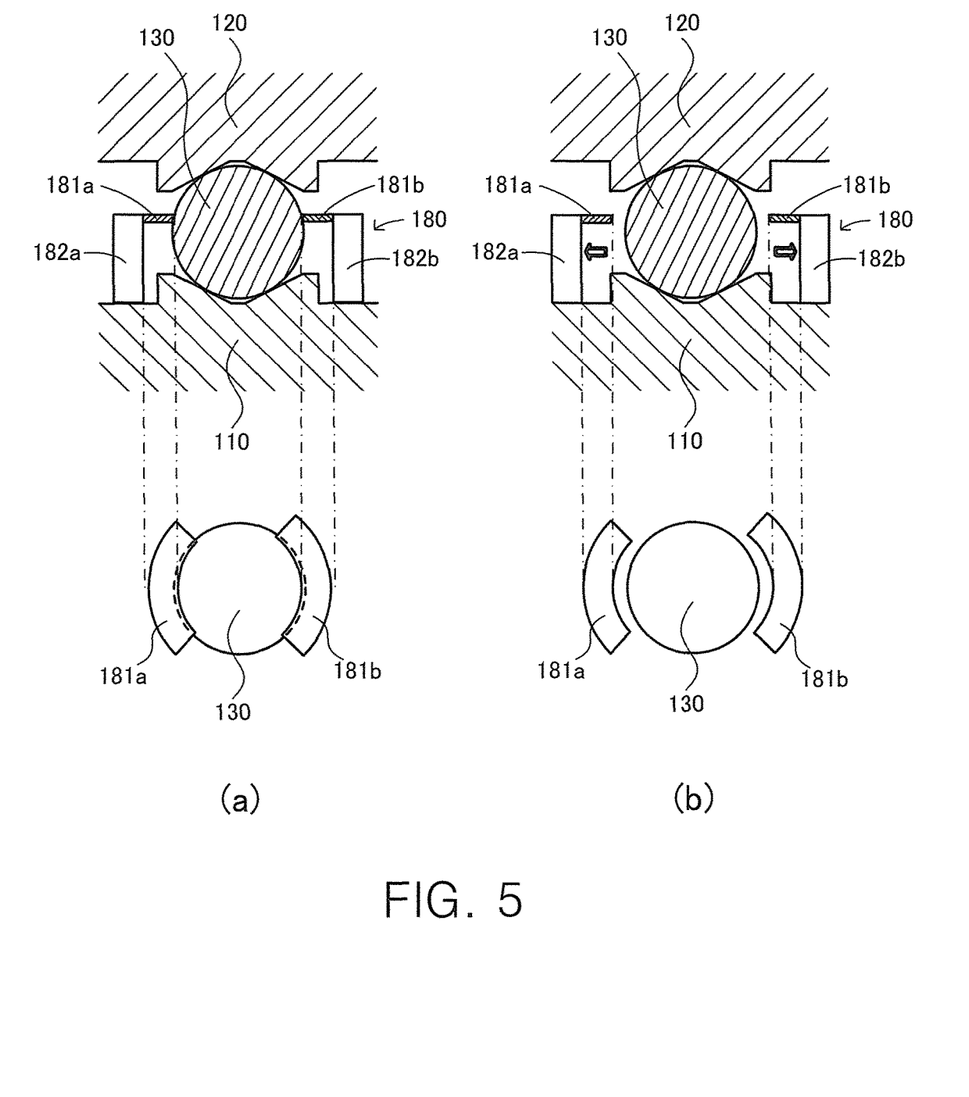
FIG. 5 is a diagram showing an example of a ball holding structure switchable between a fixed ball state and a travelable ball state.

FIG. 5 shows an example of a ball holding structure realizing such a function. FIG. 5(a) shows an example of the fixed ball state and FIG. 5(b) shows an example of the travelable ball state. Note that the shapes of the first base 110 and the second base 120 are different from those in FIG. 3, etc. for the sake of illustration. This is the same for FIG. 6 described below.

A ball holding structure 180 comprises a pair of holding members 181a and 181b as holding members for holding the ball 130. In FIG. 5, (a) and (b) both show a cross-sectional view of the ball 130 and around it (top row) and shapes of the holding members 181a and 181b seen from a direction perpendicular to the cross section (bottom row). Also, the ball holding structure 180 comprises a pair of movable support structures 182a and 182b as movable support structures for supporting the holding members movably. The movable support structure 182a supports the holding member 181a and the movable support structure 182b supports the holding member 181b. Note that, regarding the holding members 181a and 181b, the cross-sectional views of FIG. 5 (top row) merely show their cross-sectional end faces.

The holding members 181a and 181b comprise respective non-elastic members in a shape which has an arc in an inner edge thereof. In the state shown in FIG. 5(a), the non-elastic members are placed the same distance from the first base 110 and face each other spaced apart by a first distance so that their arcs constitute the same circle. The holding members 181a and 181b contact a surface of the ball 130 along the circle so that the ball 130 is fixed in a single position between them and the first base 110.

In the state shown in FIG. 5 (b), the interval between the holding members 181a and 181b is larger. In other words, the holding members 181a and 181b face each other with a second distance greater than the first distance. In this state, the ball 130 is not fixed in any single position and can travel within a range having a predetermined expanse in a manner similar to the first embodiment.

Thus, by making the fixed ball state and the travelable ball state switchable, the positional precision upon locating the bases can be improved. For example, the user locates the first base and the second base in the fixed ball state and then transitions them into the travelable ball state. In this way, the positional precision of the bases is improved because positional repeating precision of the balls upon locating the bases is improved. This is particularly effective in cases where positions or directions of the grooves include an error.

Note that those skilled in the art can design a construction for making the fixed ball state and the travelable ball state switchable as needed. For example, the movable support structures 182a and 182b can be constructed so that they both can slidably travel in different positions on the same line, wherein they are in the fixed ball state if they are fixed spaced apart by the first distance and they are in the travelable ball state after they slide to travel with respect to each other so that they are fixed spaced apart by the second distance. Also, the movable support structures 182a and 182b may be constructed to rotate around appropriate pivots so that they open.

Shapes of the holding members are not limited to those shown in the drawings. The shape may also be a semicircle. In this case, the two holding members would contact each other to form a circle in the fixed ball state. Also, the shape of the holding members is not limited to any arc. Those skilled in the art can design a shape that can fix the ball in a single position as needed. Elastic members may be used in a portion or the entirety of the movable support structure or in a portion or the entirety of the holding members.

FIG. 6 shows an example of a construction of a ball holding structure 183 different from the construction shown in FIG. 5. FIG. 6 (a) shows an example in the fixed ball state and FIG. 6 (b) shows an example in the travelable ball state.

The ball holding structure 183 comprises a pair of holding members 184a and 184b as holding members for holding the ball 130. Also, the ball holding structure 183 comprises a pair of movable support structures 185a and 185b as movable support structures for supporting the holding members movably. The movable support structure 185a supports the holding member 184a and the movable support structure 185b supports the holding member 184b. Note that, regarding the holding members 184a and 184b, FIG. 6 merely shows their cross-sectional end faces. Also, FIG. 6 does not particularly show any member or the like that fixes the movable support structures 185a and 185b with respect to the first base 110.

Shapes of the holding members 184a and 184b can be constructed for example similar to the holding members 181a and 181b of FIG. 5. Also, the holding members 184a and 184b are both spaced apart from the first base 110 by a first distance and their arcs constitute the same circle. The holding members 184a and 184b contact a surface of the ball 130 along the circle so that the ball 130 is fixed in a single position between them and the first base 110.

The holding members 184a and 184b are lifted in the state shown in FIG. 6 (b). In other words, the holding members 184a and 184b are spaced apart from the first base 110 by a second distance greater than the first distance. In this state, the ball 130 is not fixed in any single position and can travel within a range having a predetermined expanse in a manner similar to the first embodiment.

Those skilled in the art can design a construction for making the fixed ball state and the travelable ball state switchable as needed. For example, the movable support structures 185a and 185b can be constructed so that they can slidably travel in a direction non-parallel to the first base 110 (e.g. a direction perpendicular to the first base 110), wherein they are in the fixed ball state if they are fixed at the first distance from the first base 110 and they are in the travelable ball state after they slide to travel so that they are fixed at the second distance from the first base 110.

The shapes of the holding members are not limited to those shown in the drawings. The shape may be a semicircle. In this case, the two holding members would contact each other to form a circle in the fixed ball state. Also, in an example such as shown in FIG. 6, the relative positional relationships among portions of the holding members are fixed constantly, so the holding members do not have to be separate and may be constructed by a single member (e.g. a single circular member such as a washer). Further, the shape of the holding members is not limited to any arc or circle. Those skilled in the art can design a shape that can fix the ball in a single position as needed. Elastic members may be used in a portion or the entirety of the movable support structure or in a portion or the entirety of the holding members.

What is claimed is:

1. A kinematic support structure, comprising:
   a first support member comprising a first elongated groove portion, a second elongated groove portion and a third elongated groove portion;
   a second support member comprising a fourth elongated groove portion, a fifth elongated groove portion and a sixth elongated groove portion; and
   a first ball, a second ball and a third ball all movable with respect to the first support member and the second support member, wherein:
   the first elongated groove portion and the fourth elongated groove portion face each other across the first ball;
   the second elongated groove portion and the fifth elongated groove portion face each other across the second ball; and
   the third elongated groove portion and the sixth elongated groove portion face each other across the third ball, and wherein the first support member comprises:
   a first ball holding structure for restricting a position of the first ball within a first travel range;
   a second ball holding structure for restricting a position of the second ball within a second travel range; and
   a third ball holding structure for restricting a position of the third ball within a third travel range, and wherein:
   the travel ranges have respective finite expanses;
   the first ball holding structure includes an elastic member for pushing the first ball in an inward direction of the first travel range;
   the second ball holding structure includes an elastic member for pushing the second ball in an inward direction of the second travel range; and
   the third ball holding structure includes an elastic member for pushing the third ball in an inward direction of the third travel range.

2. The kinematic support structure as claimed in claim 1, wherein:
   the first elongated groove portion, the second elongated groove portion and the third elongated groove portion are arranged in a radial configuration;
   the fourth elongated groove portion, the fifth elongated groove portion and the sixth elongated groove portion are arranged in a radial configuration;
   the first elongated groove portion abuts on the first ball at two points;
   the elongated second groove portion abuts on the second ball at two points;
   the elongated third groove portion abuts on the third ball at two points;
   the elongated fourth groove portion abuts on the first ball at two points;
   the elongated fifth groove portion abuts on the second ball at two points; and the elongated sixth groove portion abuts on the third ball at two points.

3. A kinematic support structure, comprising:
a first support member comprising a first elongated groove portion, a second elongated groove portion and a third elongated groove portion;
a second support member comprising a fourth elongated groove portion, a fifth elongated groove portion and a sixth elongated groove portion; and
a first ball, a second ball and a third ball all movable with respect to the first support member and the second support member, wherein:
the first elongated groove portion and the fourth elongated groove portion face each other across the first ball;
the second elongated groove portion and the elongated fifth groove portion face each other across the second ball; and
the third elongated groove portion and the sixth elongated groove portion face each other across the third ball, and wherein
the kinematic support structure comprises a ball holding structure switchable between a fixed ball state and a travelable ball state.

4. The kinematic support structure as claimed in claim 1, further comprising pressing means for pushing the first support member and the second support member toward each other.

5. The kinematic support structure as claims in claim 3, wherein
the ball holding structure comprises a pair of holding members;
the pair of holding members are spaced apart from the first support member by a first distance in the fixed ball state; and
the pair of holding members is spaced apart from the first support member by a second distance greater than the first distance in the travelable ball state.

6. The kinematic support structure as claimed in claim 3, wherein:
the first elongated groove portion, the second elongated groove portion and the third elongated groove portion are arranged in a radial configuration;
the fourth elongated groove portion, the fifth elongated groove portion and the sixth elongated groove portion are arranged in a radial configuration;
the first elongated groove portion abuts on the first ball at two points;
the second elongated groove portion abuts on the second ball at two points;
the third elongated groove portion abuts on the third ball at two points;
the fourth elongated groove portion abuts on the first ball at two points;
the fifth elongated groove portion abuts on the second ball at two points; and
the sixth elongated groove portion abuts on the third ball at two points.

7. The kinematic support structure as claimed in claim 3, further comprising pressing means for pushing the first support member and the second support member toward each other.

* * * * *